US012498087B2

(12) United States Patent
Riley

(10) Patent No.: US 12,498,087 B2
(45) Date of Patent: Dec. 16, 2025

(54) LIQUID DELIVERY SYSTEM

(71) Applicant: Eaton Intelligent Power Limited, Dublin (IE)

(72) Inventor: Steven Charles Riley, Hampshire (GB)

(73) Assignee: Eaton Intelligent Power Limited, Dublin (IE)

( * ) Notice: Subject to any disclaimer, the term of this patent is extended or adjusted under 35 U.S.C. 154(b) by 69 days.

(21) Appl. No.: 18/539,699

(22) Filed: Dec. 14, 2023

(65) Prior Publication Data

US 2024/0200725 A1 Jun. 20, 2024

Related U.S. Application Data

(60) Provisional application No. 63/387,826, filed on Dec. 16, 2022.

(51) Int. Cl.
*F17C 9/00* (2006.01)
*F17C 3/02* (2006.01)
*F17C 7/04* (2006.01)

(52) U.S. Cl.
CPC .......... *F17C 7/04* (2013.01); *F17C 2221/012* (2013.01); *F17C 2223/0161* (2013.01); *F17C 2225/0123* (2013.01); *F17C 2227/0135* (2013.01); *F17C 2227/0302* (2013.01); *F17C 2227/0337* (2013.01); *F17C 2250/01* (2013.01); *F17C 2265/066* (2013.01)

(58) Field of Classification Search
CPC ...... F17C 3/02; F17C 7/04; F17C 9/00; F17C 9/02
See application file for complete search history.

(56) References Cited

U.S. PATENT DOCUMENTS

| | | | | |
|---|---|---|---|---|
| 3,427,806 | A | 2/1969 | Truax | |
| 3,803,858 | A | 4/1974 | Simon | |
| 4,136,721 | A | 1/1979 | Holmqvist | |
| 5,415,001 | A | 5/1995 | Powars | |
| 5,937,655 | A | 8/1999 | Weiler et al. | |
| 6,505,469 | B1 | 1/2003 | Drube | |
| 8,950,195 | B2 | 2/2015 | Watts | |
| 2007/0044485 | A1 | 3/2007 | Mahl | |
| 2010/0005812 | A1 | 1/2010 | Watts et al. | |
| 2017/0291486 | A1 | 10/2017 | Tanaka | |
| 2018/0216877 | A1 * | 8/2018 | Dabkowski ............ | F25J 1/0072 |

OTHER PUBLICATIONS

Extended European Search Report for Application No. 23216582.9 mailed May 15, 2024.

* cited by examiner

*Primary Examiner* — Paul J Gray
(74) *Attorney, Agent, or Firm* — Merchant & Gould P.C.

(57) ABSTRACT

A liquid delivery system is configured to pump a liquid (e.g., a cryogenic liquid) without a mechanical pump. The system includes a storage tank to store the liquid at low pressure; a transition tank configured to transition the low pressure liquid to a high pressure gas; and a pumping tank configured to first receive part of the low pressure liquid from the source tank and then to receive the pressurized gas from the transition tank to expel the low pressure liquid from the pumping tank. The liquid delivery system can be used to deliver fuel to an engine (e.g., on an aircraft).

15 Claims, 7 Drawing Sheets

LIQUID DELIVERY SYSTEM

CROSS-REFERENCE TO RELATED APPLICATIONS

This application claims the benefit of U.S. Application No. 63/387,826, filed Dec. 16, 2022, and titled "Liquid Delivery System," the disclosure of which is hereby incorporated herein by reference in its entirety.

BACKGROUND

Mechanical pumps have traditionally been used to pump fuel into engines to provide an energy source for the engine. However, traditional fuels often are derived from fossil fuels such as coal, petroleum, natural gas, or other sources. Using fossil fuels as energy sources may result in the emission of greenhouse gases, which can be harmful to the environment and in limited supply.

SUMMARY

Hydrogen is usable as a fuel source in both a liquid and a gaseous state. Hydrogen provides a cleaner burning fuel than traditional fossil fuels, resulting in fewer greenhouse gas emissions. However, the design of a hydrogen fuel system presents a number of challenges. For example, the hydrogen must be stored safely, and the volume and nature of hydrogen poses challenges to effective storage, especially on transportation vessels such as aircrafts, trains, or ships that have limited space and weight capacity.

It is not currently feasible to store sufficient quantities of gaseous hydrogen—for example, onboard an aircraft—because gaseous hydrogen must be kept highly pressurized (e.g., around 200 bar) to be routed to an engine as fuel. Maintaining this high pressure to store gaseous hydrogen requires large and heavy pressure vessels. Liquid hydrogen may be stored more easily at a lower pressure of around 2 bar, but this pressure alone is not sufficient to route the liquid hydrogen into an engine to serve as fuel.

Traditional fuel systems may utilize mechanical pumps to generate pressure and pump liquid, but using mechanical pumps has proven to be unreliable with cryogenic fuel sources like liquid hydrogen. The temperature of liquid hydrogen is about 20 Kelvin. Mechanical pumps exposed to such low temperatures tend to suffer adverse effects, including breakage.

The present disclosure describes systems and methods for pumping a cryogenic liquid (e.g., liquid hydrogen) without mechanical pumps. In certain examples, the cryogenic liquid is a fuel for an engine. These systems and methods avoid or minimize using fuel sources that generate carbon dioxide emissions. In certain examples, the systems use liquid hydrogen as a fuel source that is pressurized to a gaseous state, but any suitable cryogenic liquid may be used. In various examples, the delivery systems and methods disclosed herein can be used in a variety of engines such as in aircrafts, ships or other water vessels, vehicles, manufacturing or machinery, or any other suitable engine.

In certain examples of the present disclosure, a liquid (e.g., fuel) delivery system systems comprise a source tank housing liquid hydrogen, at least one transition tank, and at least one pumping tank, and a series of valves connecting the tanks. In certain examples, the liquid delivery system also can include at least one dump tank. In certain examples, a cryogenic liquid disposed in the storage tank is held under low pressure (e.g., about 2 bar). The cryogenic liquid is subjected to higher pressures (e.g., about 200 bar) at the pumping tank. Accordingly, the larger storage tank can be structured to hold low pressure fluids while only the smaller pumping tank is structured to hold high pressure fluids.

In certain implementations, low pressure (e.g., about 2 bar) cryogenic liquid from the source tank may be directed to the pumping tank and the transition tank. The transition tank may heat the cryogenic liquid to convert it to a pressurized gaseous state (e.g., about 200 bar). The pressurized gas from the transition tank is routed to the pumping tank to exert pressure on the cryogenic liquid therein. The pressurized gas pushes the cryogenic liquid in the pumping tank through an outlet and towards the engine at the higher pressure. In various implementations, the transition tank heats the liquid hydrogen using ambient air flow, combustion, or a heating element.

In certain examples, the delivery systems also include one or more heat exchangers. The heat exchangers may take the gaseous hydrogen from the dump dank and convert it to liquid hydrogen that is routed back to the source tank. The heat exchanger can convert the gaseous hydrogen to liquid hydrogen using the liquid hydrogen expelled from the outlet of the pumping tank and routed past the heat exchanger towards the engine.

In accordance with some aspects of the disclosure, a liquid delivery system (e.g., a fuel delivery system for an engine) includes a source tank having a first internal pressure, the source tank being configured to hold a liquid (e.g., a cryogenic liquid) at the first internal pressure; a transition tank including a heat supply region, a liquid receiving region, and a gas holding region, the transition tank being configured to use the heat supply region to heat liquid disposed at the liquid receiving region to a gas, which collects in the gas holding region, thereby pressurizing the gas above the first internal pressure; and a pumping tank including a liquid region and a gaseous region, the pumping tank having an outlet. A first low pressure line is configured to selectively supply a first portion of the liquid from the source tank to the liquid region of the pumping tank. A second low pressure line is configured to selectively supply a second portion of the liquid from the source tank to the liquid receiving region of the transition tank. A high pressure line is configured to selectively supply the pressurized gas collected within the gas holding region of the transition tank to the gaseous region of the pumping tank, whereby the pressurized gas expels the first portion of the liquid out of the pumping tank through the outlet.

In accordance with other aspects of the disclosure, a method of delivering liquid (e.g., fuel) includes delivering a first portion of the liquid from a source tank (e.g., a fuel tank) to a pumping tank using a pressure differential between the source tank and the pumping tank; delivering a second portion of the liquid from the source tank to a transition tank using a pressure differential between the source tank and the transition tank; heating the second portion of the liquid within the transition tank to transition at least some of the second portion of the liquid into a gas and continuing to heat the second portion of the liquid until the gas reaches a pressurization threshold; and delivering the pressurized gas from the transition tank to the pumping tank so that the pressurized gas acts on the first portion of the liquid to expel the liquid from the pumping tank (e.g., to an engine).

In accordance with other aspects of the disclosure, a method of pumping a liquid (e.g., a cryogenic liquid) through a flow system includes performing an intake stroke and then a discharge stroke. The flow system includes a source tank, a transition tank, a pumping tank, and a dump tank. The intake stroke includes closing an outlet of the pumping tank; opening a first valve arrangement to connect the source tank to the pumping tank while the source tank has a higher internal pressure than the pumping tank; closing a second valve arrangement to disconnect the transition tank and the pumping tank; opening a third valve arrangement to connect the pumping tank and the dump tank, wherein the dump tank has a lower internal pressure than the pumping tank. The discharge stroke is performed after the intake stroke and includes closing the first valve arrangement to disconnect the source tank and the pumping tank; opening the second valve arrangement to connect the transition tank and the pumping tank; and closing the third valve arrangement to disconnect the pumping tank and the dump tank. In certain examples, the transition tank continuously heats the liquid to transition the liquid into the pressurized gas.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
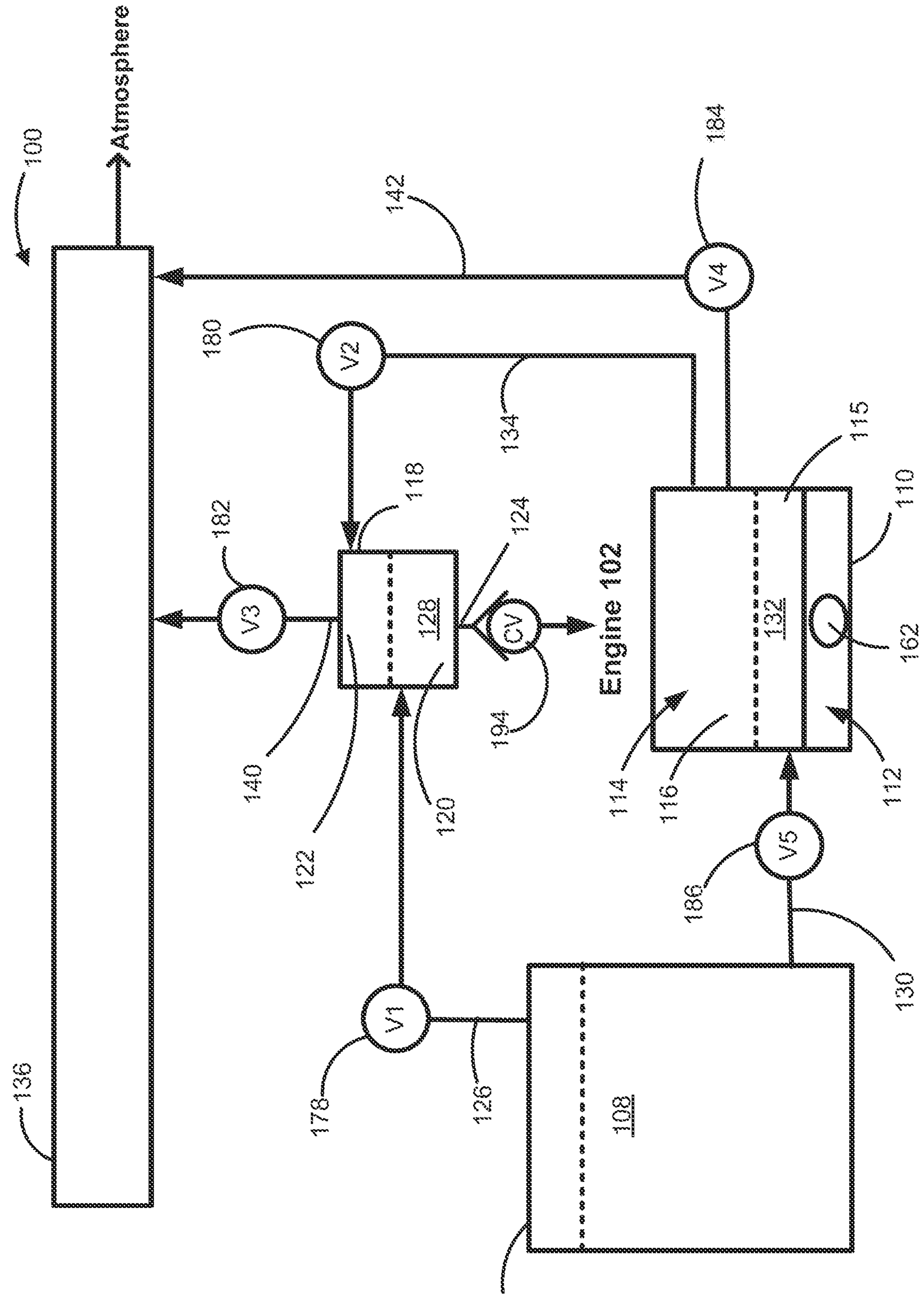
FIG. 1 is a schematic diagram of an example liquid delivery system, the system including one pumping tank and one transition tank.

FIG. 1 illustrates an example liquid delivery system 100 including a source tank 104, a pumping tank 118, and a transition tank 110. In certain implementations, the liquid delivery system 100 also includes a dump tank 136. In certain implementations, the liquid delivery system 100 can be utilized to supply fuel to an engine 102 (e.g., shown in FIG. 4). The source tank 104 is configured to store a cryogenic liquid 108 (e.g., that can be used to fuel an engine 102). In certain examples, the liquid 108 is liquid hydrogen, though other suitable cryogenic liquids may be used such as nitrogen, oxygen, or helium. In certain implementations, the source tank 104 is configured to hold liquid hydrogen 108 at a pressure (e.g., of 0.5 bar to 10 bar, of 1-5 bar, of about 2 bar, of about 1 bar, of about 3 bar) and temperature (e.g., of less than 21K, of less than 20.5K, of about 20K) in order to keep the hydrogen in a liquid state. When the fuel delivery system 100 is used in an aircraft, storing the liquid hydrogen 108 at a low pressure inhibits the liquid hydrogen from boiling, e.g., when the atmospheric pressure reduces at high altitudes.

In operation, liquid hydrogen 108 is pumped through the fuel delivery system 100 to an engine 102 using an intake stroke and a discharge stroke. During the intake stroke, a portion of the liquid hydrogen is supplied from the source tank 104 to the pumping tank 118 by means of a pressure differential between the source tank 104 and the pumping tank 118. During the discharge stroke, that portion of the liquid hydrogen is expelled from the source tank 104 using a pressurized gas provided to the pumping tank 118 from the transition tank 110. In certain implementations, the pressurized gas is produced from transitioning another portion of the liquid hydrogen supplied from the source tank 104.

The source tank 104 has a first internal pressure that is initially greater than the internal pressure of the pumping tank 118, the transition tank 110, and the dump tank 136. In certain implementations, the first internal pressure is about 2 bar. In other implementations, the first internal pressure of the source tank 104 is greater than ambient air pressure. The dump tank 136 is at a lower internal pressure than both the pumping tank 118 and the transition tank 110. In certain examples, the dump tank 136 has an internal pressure of less than 2 bar. In certain examples, the dump tank 136 has an internal pressure of less than 1 bar. In certain examples, the dump tank 136 has an internal pressure of less than 0.5 bar. In an example, the dump tank 136 has an internal pressure of 0.2 bar. In certain implementations, the dump tank 136 can be vented to atmosphere to reduce the pressure within the dump tank 136.

The source tank 104 is connected to the pumping tank 118 with a first low pressure line 126. A first valve arrangement 178 controls flow through the first low pressure line 126. Valve arrangement 178 can be any type of valve or other suitable arrangement for controlling the flow of liquid. The pumping tank 118 is configured to hold both liquid and gaseous hydrogen. Inside the pumping tank 118 is a liquid region 120, where the liquid hydrogen 108 is deposited when it flows from the source tank 104 through valve arrangement 178 to the pumping tank 118. The pumping tank 118 also includes gaseous region 122 continuous with the liquid region **120*f*. The pumping tank 118 includes an outlet 124 through which the output liquid hydrogen 108 from the pumping tank 118 flows (e.g., towards the engine 102). The pumping tank 118 is configured to withstand higher pressure than the source tank 104. In an example, the pumping tank 118** is configured to withstand high pressures (e.g., 100 bar-300 bar, 150 bar-350 bar, 50 bar-250 bar, 150 bar, 200 bar, 250 bar, etc.).

In certain examples, the transition tank 110 defines two chambers that are physically separated but thermally linked—a main chamber 114 and a heat supply chamber 112. The main chamber 114 defines a liquid receiving region 115 and a gas holding region 116 that are continuous with each other. When liquid hydrogen 108 is heated, the resulting gaseous hydrogen sits at or above the liquid hydrogen 108 in the gas holding region 116, forming a liquid/gas interface. The heat supply region 112 transmits sufficient heat to the main chamber 114 to transition some or all of the liquid hydrogen 108 within the main chamber 114 to a gas.

In certain implementations, the transition tank 110 is connected to the source tank 104 by a second low pressure line 130. In certain examples, liquid hydrogen 108 can be directed from the source tank 104 to the main chamber 114 of the transition tank 110, where the liquid hydrogen 108 flows to the liquid receiving region 115. In some implementations, the transition tank 110 only receives liquid hydrogen 108 from the source tank 104 during initial system priming. In other implementations, the transition tank 110 can be replenished from the source tank 104. A valve arrangement 186 controls flow through the second low pressure line 130. In other implementations, the transition tank 110 receive liquid hydrogen indirectly from the source tank 104 via the pumping tank 118, which will be described in more detail herein. In certain examples, the transition tank 110 receives liquid hydrogen directly from the source tank 104 at the beginning of an operation (e.g., a flight) and receives replenishment of the liquid hydrogen via the pumping tank throughout the operation.

In some implementations, ambient air can be used as a heat source to drive the system. For example, ambient air can be directed to the heat supply region 112 from an interior of the aircraft or other structure holding the liquid delivery system 100. In another example, ambient air can be directed to the heat supply region 112 from an exterior of the aircraft or other structure holding the liquid delivery system 100. In other implementations, one or more heating elements 162 may be disposed within the heat supply region 112. In some examples, the one or more heating elements 162 include burners. In certain examples, the one or more burners may combust gaseous hydrogen as will be described in more detail herein. In other examples, the one or more heating elements 162 include an electric heating element.

In operation, liquid hydrogen 108 is pumped through the liquid delivery system 100 to an output using an intake stroke and a discharge stroke. During the intake stroke, the outlet 124 of the pumping tank 118 leading to the engine 102 is closed. For example, a check valve 194 may close the outlet 124 when not supplied with a sufficient amount of pressure (e.g., about 200 bar). The third valve arrangement 182 connecting the pumping tank 118 to the dump tank 136 is open to enable gaseous hydrogen contained within the pumping tank 118 to move to the dump tank 136, thereby ensuring the pressure within the pumping tank 118 is lower than the pressure within the source tank 104 during the intake stroke. Also, a second valve arrangement 180 closes a high pressure line 134 from the transition tank 110 to the pumping tank 118.

The valve arrangement 178 opens the first low pressure line 126 from the source tank 104 to the pumping tank 118. Because the first internal pressure 106 of the source tank 104 is higher than the internal pressure in the pumping tank 118, a first portion 128 of the liquid hydrogen 108 flows from the source tank 104 through the first low pressure line 126 to the pumping tank 118 when the first valve arrangement 178 is opened. After the first portion 128 of liquid hydrogen 108 reaches the liquid region 120 of the pumping tank 118, valve arrangement 178 closes the first low pressure line 126. In certain examples, the first valve arrangement 178 may open and close the first low pressure line 126 based on a sensor reading from a sensor arrangement at the pumping tank 118.

In certain examples, during the intake stroke, a second portion 132 of liquid hydrogen 108 flows from source tank 104 to transition tank 110 through a second low pressure line 130 when a fifth valve arrangement 186 is open. For example, a pressure differential between the source tank 104 and the transition tank 110 may direct the flow to the transition tank 110. The second portion 132 of the liquid hydrogen 108 flows into the liquid receiving region 115 of the main chamber 114. In certain implementations, a fourth valve arrangement 184 opens a second dump line 142 between the transition tank 110 and the dump tank 136, thereby enable flow from the transition tank 110 to the dump tank 110. In certain examples, the second dump line 142 leads from the gas holding region 116 of the main chamber 114 to the dump tank 136 so that hydrogen gas can be moved from the main chamber 116 to the dump tank 136 as the liquid hydrogen enters the liquid receiving region 115. After the second portion 132 of the liquid hydrogen 108 flows into the transition tank 110, the fifth valve arrangement 186 closes the second low pressure line 130.

In certain examples, liquid hydrogen 108 flows from the source tank 104 to the transition tank 110 in a single instance during the use of the engine 102 (e.g., at engine start up). In such a case, the second portion 132 has the capacity to produce sufficient hydrogen gas for use in each discharge stroke for the duration of a flight or other operation of the engine 102. In other examples, a second portion 132 of the liquid hydrogen 108 flows from the source tank 104 to the transition tank 110 in multiple instances during the use of engine 102. For example, the liquid hydrogen of the transition tank 110 may be replenished from the source tank 104 on each intake stroke. In other examples, the liquid hydrogen of the transition tank 110 may be replenished from the source tank 104 on periodic intake strokes or when a sensor arrangement indicates that liquid levels are low within the main chamber 114.

The heat supply region 112 of the transition tank 110 heats the liquid hydrogen 108 in the liquid receiving region 115, thereby transitioning a portion of the liquid hydrogen 108 to gaseous hydrogen. The gaseous hydrogen, which fills the gas holding region 116 of the transition tank 110, has a higher pressure than the liquid hydrogen. Accordingly, transitioning the liquid hydrogen to a gas increases the internal pressure within the transition tank 110. In certain implementations, a sensor arrangement (e.g., a temperature sensor, a pressure sensor, a combination of the two, a gas sensor, etc.) may be disposed at the gas holding region 116 or elsewhere within the transition tank 110 to detect the internal pressure. When enough gas has been produced to generate pressure at a predetermined threshold (e.g., 200 bar), the heat supply region 112 reduces the amount of heat or ceases heating the main chamber 114. For example, a heating element can be turned down or off. In another example, a passage connected to ambient air may be closed.

The discharge stroke is performed to expel the first portion 128 of liquid hydrogen 108 from the pumping tank 118 towards the engine 102. During the discharge stroke, the second valve arrangement 180 opens the high pressure line 134 between the gas holding region 116 of the transition tank 110 and a gaseous region 120 of the pumping tank 118. The gaseous hydrogen flows through a high pressure line 134 to the gaseous region 122 of the pumping tank 118 because the gaseous hydrogen exists at a higher pressure than the pumping tank 118. The gaseous hydrogen applies pressure to the surface of the first portion 128 of liquid hydrogen 108 held within the liquid region 120 of the pumping tank 118. When the exerted pressure (e.g., 200 bar) exceeds the pressure downstream of the check valve 194, the first portion 128 of the liquid hydrogen 108 is expelled through check valve 194.

In certain examples, once the volume of liquid hydrogen 108 in the pumping tank 118 is depleted, the discharge stroke ends and the intake stroke begins again. The discharge stroke is completed by closing the high pressure line 134 using the second valve arrangement 134. In certain implementations, during the intake stroke, the pumping tank 118 is depressurized by opening the first dump line 140 to the dump tank 136 using the third valve arrangement 182. Opening the first dump line 140 enables a sufficient amount of the remaining gaseous hydrogen in the pumping tank 118 to flow into the dump tank 136 to lower the internal pressure of the pumping tank below the internal pressure of the source tank 104.

In some implementations, when the liquid receiving region 115 of the transition tank 110 needs to be replenished, the main chamber 114 can be depressurized by opening the second dump line 142 using the fourth valve arrangement 184. With the second dump line 142 open, a sufficient amount of gaseous hydrogen in the gas holding region 116 of the transition tank 110 can flow into the dump tank 136 to lower the internal pressure within the transition tank 110 to less than the source tank 104. In other implementations, however, the liquid hydrogen in the transition tank 110 need not be replenished. In such cases, the fourth valve arrangement 184 maintains the second dump line 142 closed so that any pressure within the main chamber 114 of the transition tank 110 is preserved. Maintaining the pressure within the main chamber 114 increases the speed at which the hydrogen transitions from a liquid to a gas. In certain examples, if replenishment is not needed during operation or is needed rarely, then the heat supply region 112 can be continuously heating the second portion 132 of the hydrogen to a sufficient level to maintain the desired pressure within the main chamber 114, e.g., throughout both the intake stroke and the discharge stroke.

The intake stroke and the discharge stroke of liquid delivery system 100 repeat cyclically to deliver pressurized liquid hydrogen 108 into the engine 102. This cycle eliminates the need for mechanical and rotating pumps, which are prone to breakage when using cryogenic liquids at low temperatures.

In certain implementations, check valves may be disposed at the outlet of each tank 104, 110, 118, 136 to inhibit backflow. For example, a check valve may be disposed at each low pressure lines 126, 130 to inhibit backflow into the source tank 104 during the intake stroke. Similarly, in certain examples, a check valve may inhibit backflow into the transition tank main chamber 114 from the dump tank 136. In certain examples, a check valve may inhibit backflow into the pumping tank 118 from the dump tank 136.

Figure 2:
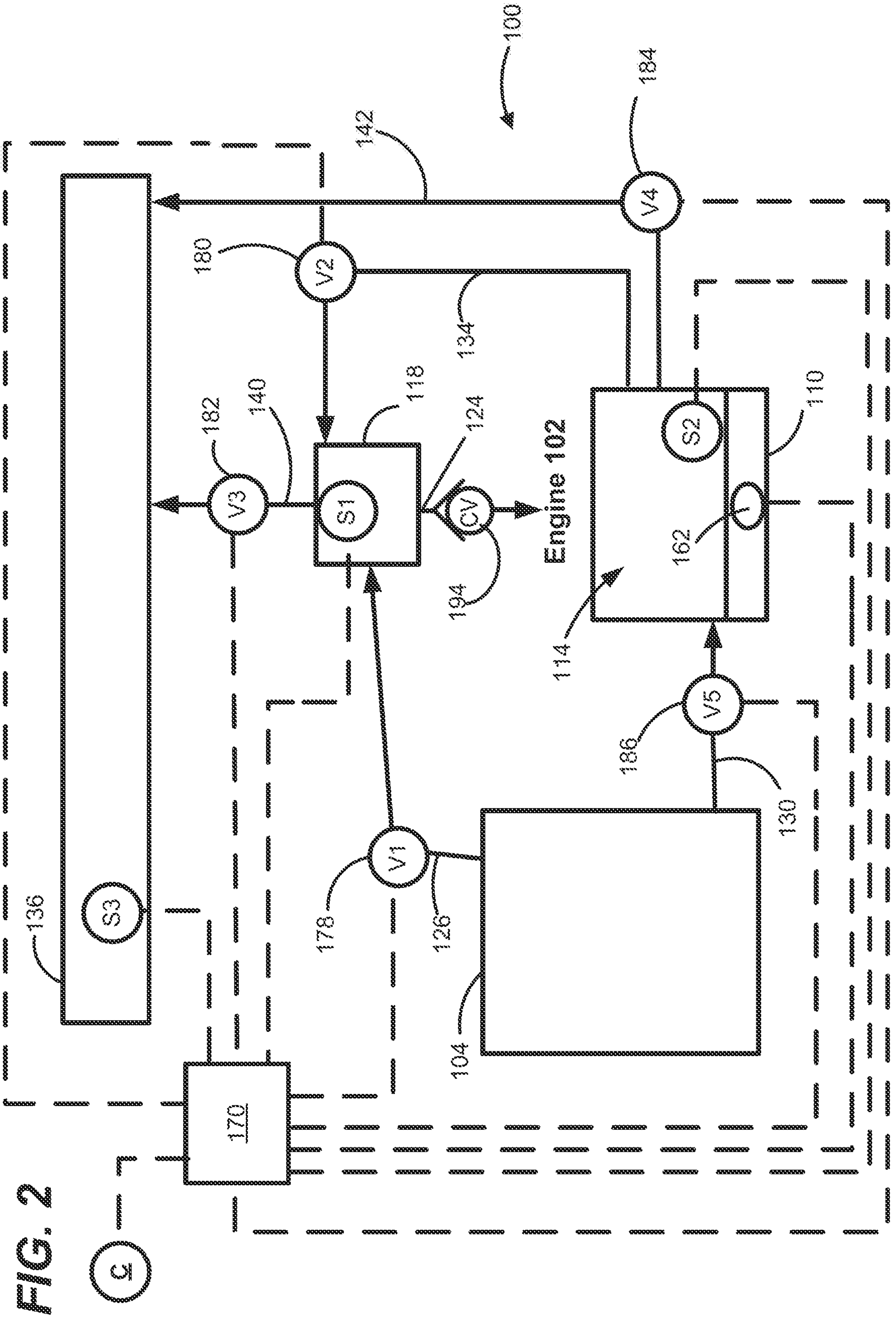
FIG. 2 is a schematic diagram of the liquid delivery system of FIG. 1 showing a sensor and control arrangement for operating the components of the liquid delivery system.

Referring now to FIG. 2, the liquid delivery system 100 can include a controller 170 that manages operation of the valve arrangements 178, 180, 182, 184, and 186. In some examples, the controller 170 is an electronic controller that communicates with an operating system C (e.g., one or more processors and memory storing operation instructions). In an example, the operating system C includes the flight management system of an aircraft. In other examples, the controller 170 can operate the valve arrangements 178, 180, 182, 184, and 186 hydraulically, pneumatically, electromechanically, etc.

In certain implementations, the controller 170 (or a different controller) can operate the heating element 162 within the transition tank 110. For example, the controller 170 may turn the heating element 162 on and off. Alternatively, the controller 170 may control the amount of heat produced by the heating element (e.g., control the amount of flow through the heat supply region 112, control the amount of fuel being combusted within the heat supply region 112, etc.

In certain implementations, the controller 170 (or a different controller) can operate one or more sensor arrangements S1, S2, S3 disposed throughout the liquid delivery system 100. In certain examples, the controller 170 may operate the valve arrangements 178, 180, 182, 184, and 186 and/or the heating element 162 based on readings obtained from the sensor arrangements S1, S2, S3. In certain implementations, a first sensor arrangement S1 may be disposed at the pumping tank 118 to monitor a liquid fill level of the pumping tank 118. For example, a level sensor may be disposed in the pumping tank 118. In other examples, the liquid fill level may be monitored indirectly by sensing an internal pressure within the pumping tank 118. In an example, the controller 170 may open the first valve arrangement 178 during an intake stroke based on the first sensor S1 determining the liquid fill level within the pumping tank is lower than an amount desired to be expelled during the next discharge stroke. In such an example, the controller 170 also may open the third valve arrangement 182 to relieve the internal pressure within the pumping tank 118 to facilitate refilling.

In certain implementations, a second sensor arrangement S2 may be disposed within the main chamber 114 of the transition tank 118. The second sensor arrangement S2 may monitor a liquid fill level within the liquid receiving region 115 of the main chamber 110. In certain examples, the controller 170 may open the fifth valve arrangement 186 during an intake stroke if the second sensor arrangement S2 reports the liquid fill level within the liquid receiving region 115 to be insufficient to create the desired amount of pressurized gas when heated. In such an example, the controller 170 also may open the fourth valve arrangement 184 to relieve the internal pressure within the transition tank 110 to facilitate refilling.

In certain implementations, a third sensor arrangement S3 may be disposed within the dump tank 136 to monitor an internal pressure of the dump tank 136. When the third sensor arrangement S3 determines the pressure within the dump tank 136 exceeds a predetermined threshold (e.g., 0.5 bar, 1 bar, 2 bar, etc.), the controller 170 may vent the dump tank 136 to atmosphere or otherwise act to release some of the pressure within the dump tank 136.

In some implementations, the predetermined thresholds for the sensor arrangements S1, S2, S3 are stored within the controller 170. In other implementations, the predetermined thresholds for the sensor arrangements S1, S2, S3 are stored within the operating system C.

Figure 3:
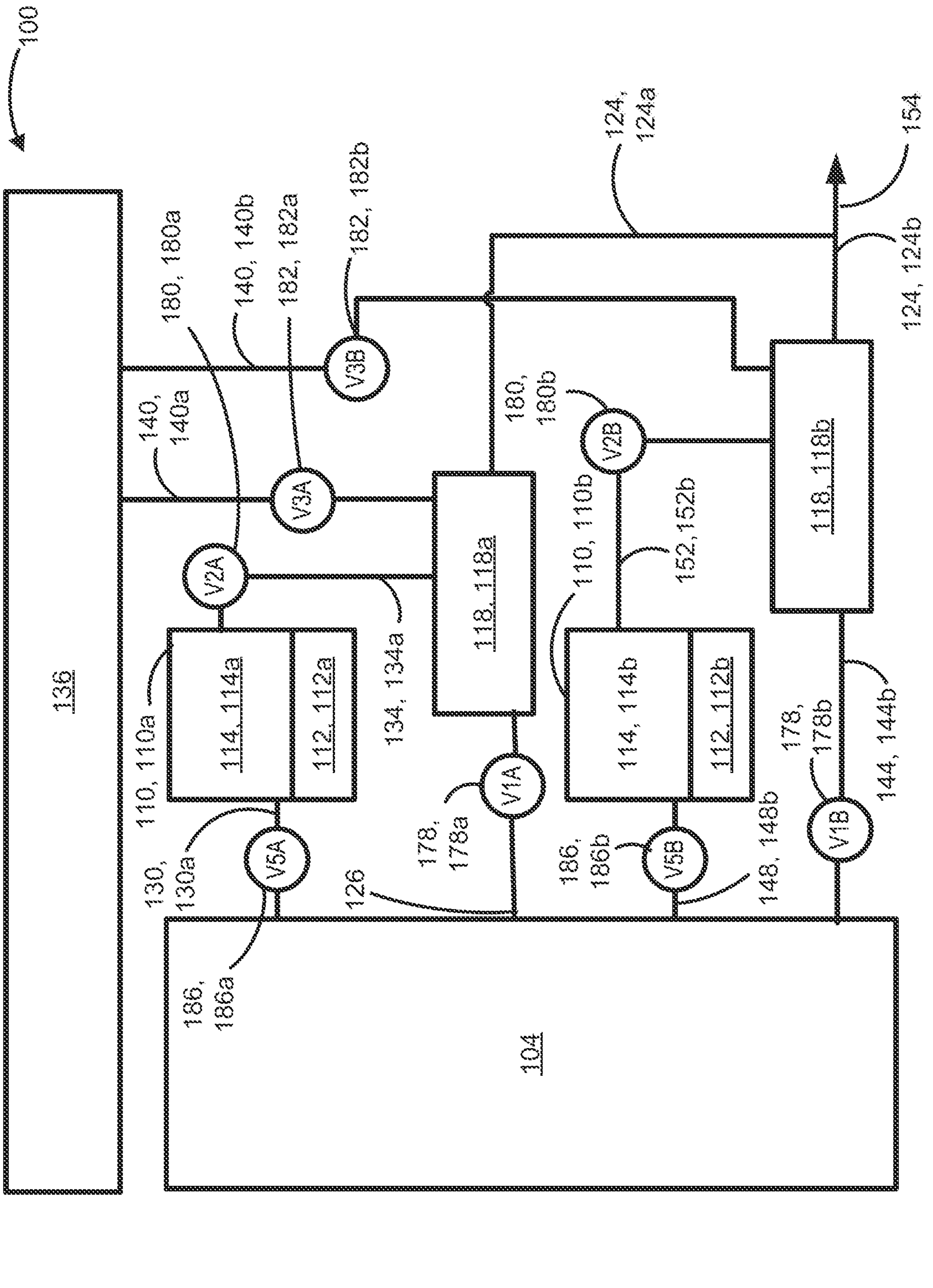
FIG. 3 is a schematic diagram of the liquid delivery system of FIG. 1 configured with multiple pumping tanks and transition tanks.

With reference to FIG. 3, multiple pumping tanks 118 and multiple transition tanks 110 are utilized within the liquid delivery system 100. In the example shown, the delivery system 100 includes a first pumping tank 118*a* and a second pumping tank 118*b*. The first pumping tank 118*a* is connected to a first transition tank 110*a* using a first high pressure line 134*a*. The second pumping tank 118*b* is connected to a second transition tank 110*b* using a second high pressure line 134*b*. In certain examples, the second pumping tank 118*b* is the same as the first pumping tank 118*a*. In certain examples, the second transition tank 110*b* is the same as the first transition tank 110*a*. In certain examples, the pumping tanks 118*a*, 118*b* are the same as the pumping tank 118 shown in FIGS. 1 and 2. Accordingly, reference to pumping tank 118 and features described above with reference to pumping tank 118 apply to both the first pumping tank 118_a_ and the second pumping tank 118_b_. In certain examples, the transition tanks 110_a_, 110_b_ are the same as the transition tank 110 shown in FIGS. 1 and 2. Accordingly, reference to transition tank 110 and features described above with reference to transition tank 110 apply to both the first transition tank 110_a_ and the second transition tank 110_b_.

The first transition tank 110_a_ supplies gaseous hydrogen through the first high pressure line 134_a_ to expel fluid from the first pumping tank 118_a_. The second transition tank 110_b_ supplies gaseous hydrogen through the second high pressure line 134_b_ to expel fluid from the second pumping tank 118_b_. In certain implementations, the output lines 124_a_, 124 of each pumping tank 118_a_, 118_b_ are routed to a common output line 154. In certain implementations, the first and second pumping tanks 118_a_, 118_b_ are operated in alternate so the first pumping tank 118_a_ is performing a discharge stroke while the second pumping tank 118_b_ is performing an intake stroke and vice versa so that a continuous or near continuous flow is supplied to the common output line 154. In certain examples, the output of a greater number (e.g., three, four, etc.) pumping tanks 118 and corresponding transition tanks 110 can be connected together and the stroke cycle of the pumping tanks 118 staggered to enhance consistency of the flow.

In the depicted implementations, the first and second pumping tanks 118_a_, 118_b_ are refilled using the same source tank 104. In other implementations, the first and second pumping tanks 118_a_, 118_b_ may be supplied from different source tanks. In the depicted example, the first and second transition tanks 110_a_, 110_b_ are supplied from the same source tank 104. In other implementations, the first and second transition tanks 110_a_, 110_b_ may be supplied from different source tanks. In certain examples, the first and second pumping tanks 118_a_, 118_b_ and the first and second transition tanks 110_a_, 110_b_ are supplied by a common source tank 104.

In the depicted implementations, the first and second pumping tanks 118_a_, 118_b_ are vented to the same dump tank 136. In other implementations, the first and second pumping tanks 118_a_, 118_b_ may be vented to different dump tanks. In the depicted example, the first and second transition tanks 110_a_, 110_b_ are vented to the same dump tank 136. In other implementations, the first and second transition tanks 110_a_, 110_b_ may be vented to different dump tanks. In certain examples, the first and second pumping tanks 118_a_, 118_b_ and the first and second transition tanks 110_a_, 110_b_ are vented to a common dump tank 136.

The fuel delivery system 100 of FIG. 3 uses a continuous cycle of intake strokes and discharges strokes, as described above with reference to FIG. 1. In operation, the first pumping tank 118_a_ and first transition tank 110_a_ perform the intake stroke and then the discharge stroke. While the first pumping tank 118_a_ and the first transition tank 110_a_ perform the discharge stroke, the second pumping tank 118_b_ and the second transition tank 110_b_ perform the intake stroke. Conversely, while the first pumping tank 118_a_ and the first transition tank 110_a_ perform the intake stroke, the second pumping tank 118_b_ and the second transition tank 110_b_ perform the discharge stroke. In this example of the fuel delivery system 100, one set of the pumping tank 118 and the transition tank 110 delivers liquid hydrogen 108 to the engine 102 in the discharge stroke while the other set of the pumping tank 118 and the transition tank 110 refills on the intake stroke. This arrangement provides a continuous or near-continuous flow of liquid hydrogen 108 to the engine 102. In other examples, the first pumping tank 118_a_ and the second pumping tank 118_b_ use a single transition tank 110 to perform the intake stroke and the discharge stroke.

Figure 4:
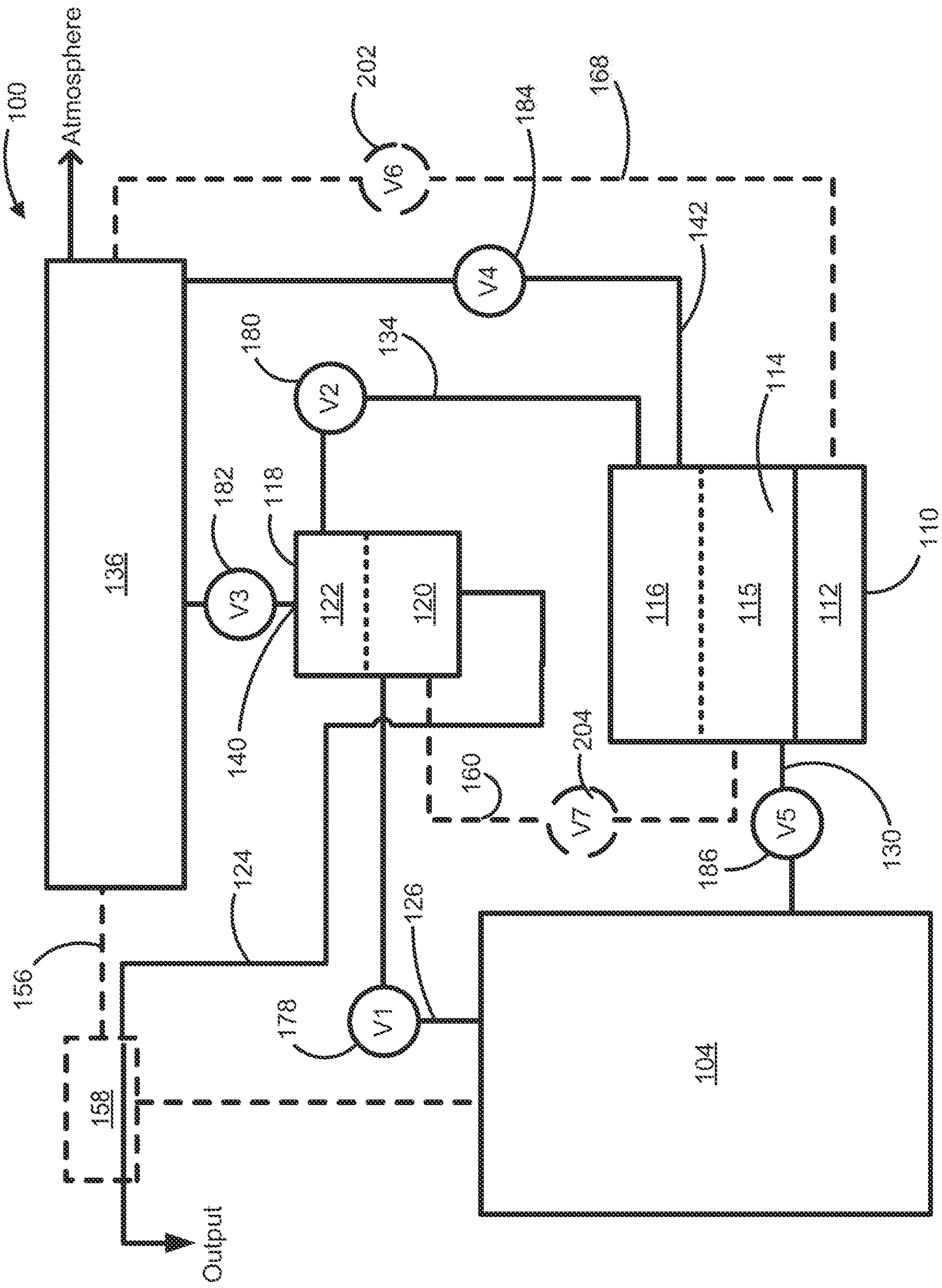
FIG. 4 is a schematic diagram of the liquid delivery system of FIG. 1 including optional additional features including a heat exchanger.

Now referring to FIG. 4, example additional features are shown with the liquid delivery system 100 of FIG. 1. A liquid delivery system 100 configured in accordance with the principles of the present disclosure may include any combination of none, one, two, or all of these additional features.

In accordance with certain aspects of the disclosure, the liquid hydrogen within the source tank 104 can be replenished using the excess gaseous hydrogen collected in the dump tank 136. In certain implementations, a heat exchanger 158 is disposed along a return line 156 extending between the dump tank 136 and the source tank 104. A portion of the gaseous hydrogen from the dump tank 136 may be routed through the heat exchanger 158 to remove sufficient heat to transition the gaseous hydrogen back to a liquid state. In some examples, the liquid hydrogen output from the pumping tank 118 during a discharge stroke is routed past the heat exchanger 158 to absorb the heat from the gaseous hydrogen. In other examples, the heat exchanger 158 may have a separate cooling system. In certain implementations, the gaseous hydrogen is directed from the dump tank 136 to the heat exchanger when the internal pressure of the dump tank 136 exceeds a predetermined threshold (e.g., 0.5 bar, 1 bar, 2 bar, etc.). For example, it may be desirable to use the heat exchanger 158 to convert gaseous hydrogen from the dump tank 136 to liquid hydrogen 108 as opposed to venting excess gaseous hydrogen to the atmosphere to avoid wasting hydrogen. In certain implementations, the gaseous hydrogen is directed from the dump tank 136 to the heat exchanger when the liquid fill level of the source tank 104 drops below a predetermined threshold (e.g., based on the amount of liquid hydrogen needed to operate the engine 102 throughout the flight or other operation of the engine 102).

Figure 7:
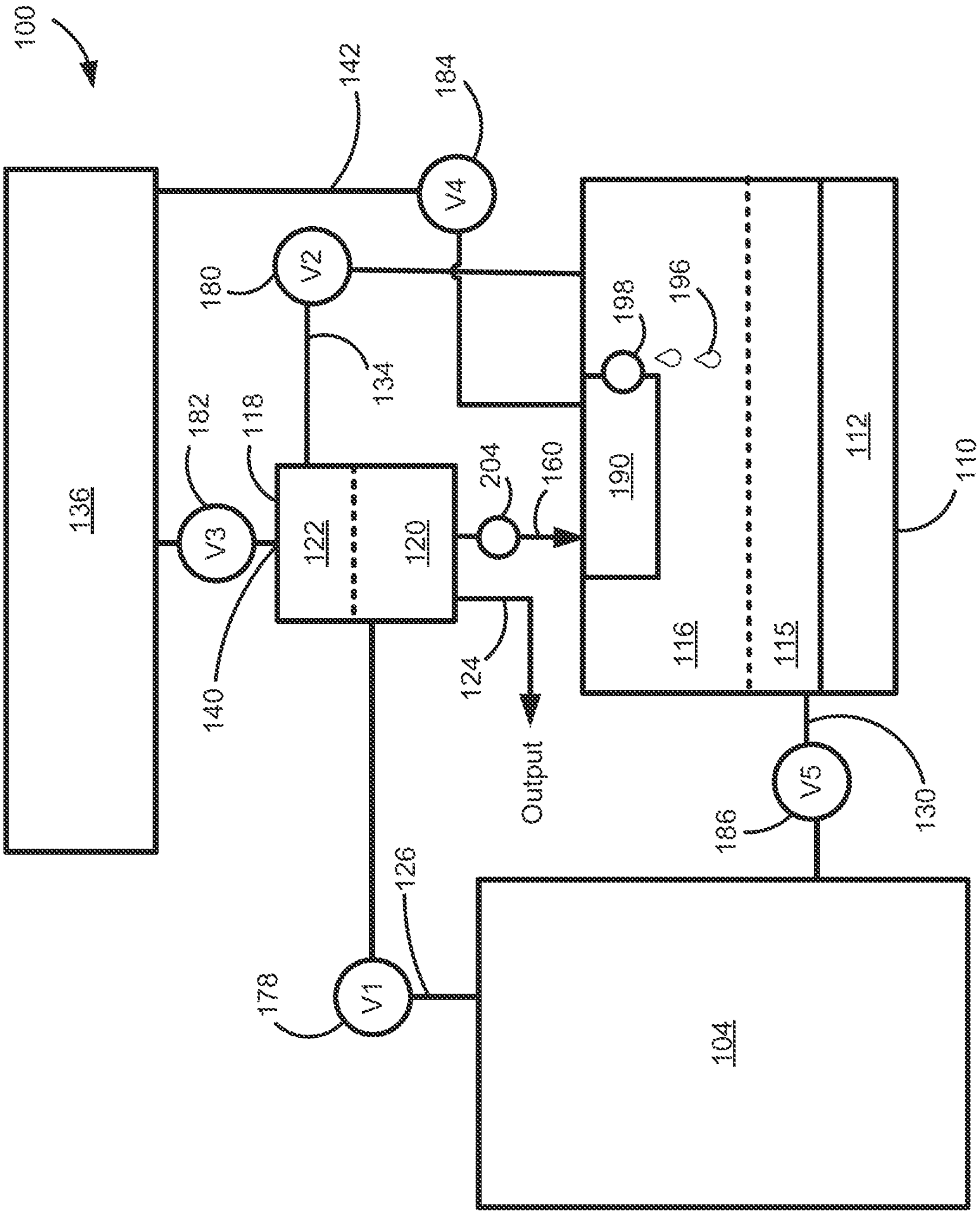
FIG. 7 is a schematic diagram of the liquid delivery system of FIG. 1 including a top-up chamber used to replenish the transition tank.

In accordance with certain aspects of the disclosure, the liquid hydrogen 108 within the liquid receiving region 114 of the transition tank 110 can be replenished from the pumping tank 118. In some implementations, a fill line 160 extends between the liquid region 120 of the pumping tank 118 and the liquid receiving region 114 of the transition tank 110. Fill line 160 allows some of the liquid hydrogen 108 from the pumping tank 118 to be supplied to the transition tank 110. For example, a seventh valve arrangement 204 is configured to open and close the fill line 160. Providing liquid hydrogen 108 from the pumping tank 118 to the transition tank 110 can be used to "top up" the transition tank 110 with liquid hydrogen 108, instead of supplying liquid hydrogen 108 from the source tank 104. In some implementations, the fill line 160 extends from the pumping tank 118 separate from the output line 124. In other implementations, the output line 124 splits between the transition tank 110 and a path towards the engine 102. Yet another example implementation for replenishing the cryogenic liquid within the transition tank 110 from the pumping tank 118 is shown in FIG. 7.

Figure 6:
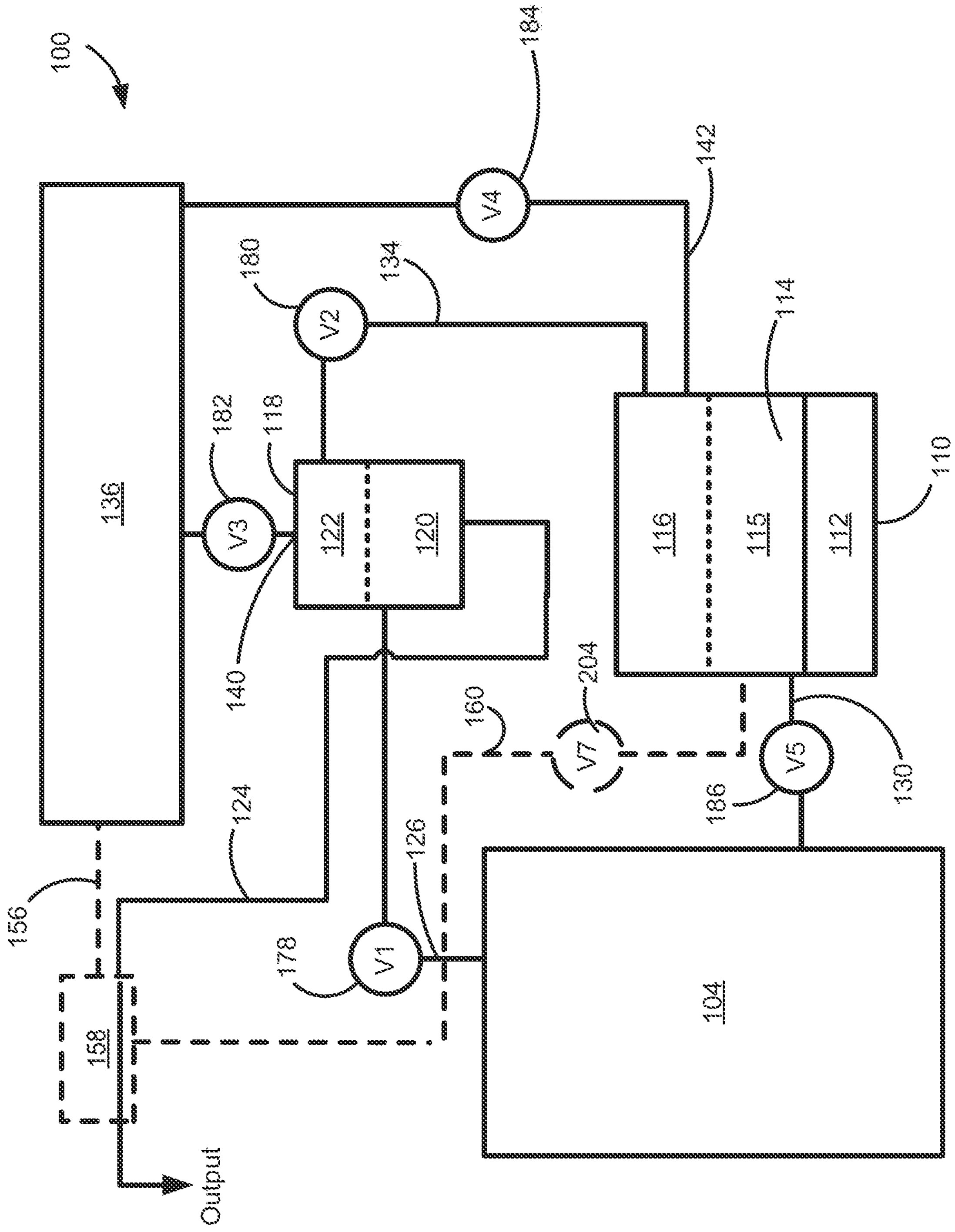
FIG. 6 is a schematic diagram of the liquid delivery system of FIG. 1 including a heat exchange used to replenish the transition tank.

In other implementations, the fill line 160 may extend to the liquid receiving region 114 of the transition tank 110 from the dump tank 136 (e.g., via the heat exchanger 158). For example, the heat exchanger 158 may condense some of the gaseous hydrogen from the dump tank 136 and direct the resulting liquid hydrogen to the transition tank 110 instead of to the source tank 104 (e.g., see FIG. 6).

In certain implementations, a top up chamber can be disposed within or above the transition tank 110.

In accordance with certain aspects of the disclosure, a supply line 168 extends from the dump tank 136 to the heat supply region 112 of the transition tank 110. Supply line 168 provides gaseous hydrogen from the dump tank 136 to the heat supply region 112 when the supply line 168 is opened by a sixth valve arrangement 202. In some examples, the gaseous hydrogen can be used by a heating element 162 in the heat supply region 112 to generate heat to transition the liquid hydrogen 108 in the liquid receiving region 114 to a gas. For example, the heating element 162 may burn the supplied gaseous hydrogen to produce the heat.

Figure 5:
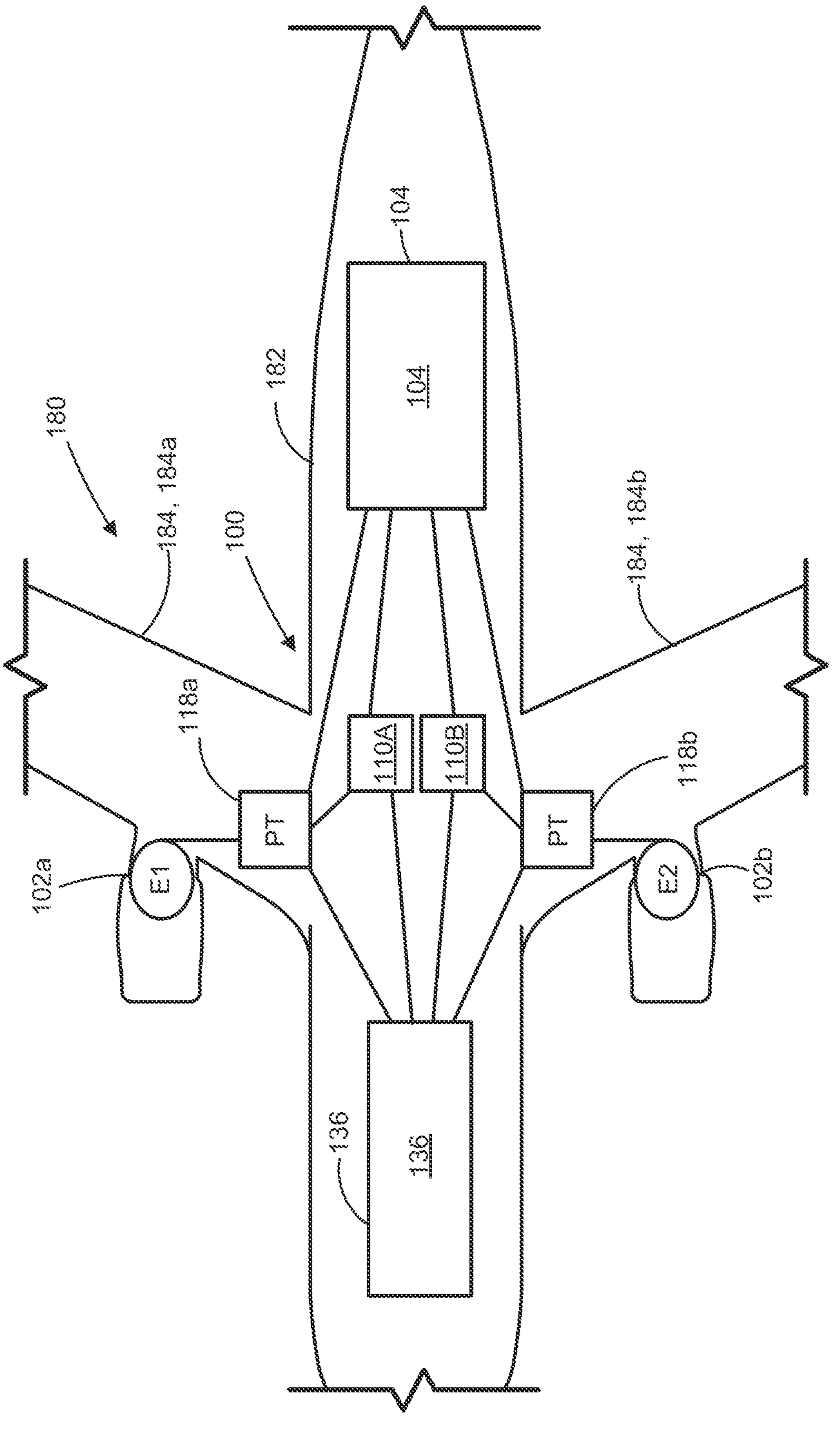
FIG. 5 is a schematic diagram of an example liquid delivery system configured in accordance with the principles of the present disclosure mounted aboard an aircraft.

FIG. 5 is a schematic view of liquid delivery system 100 configured to supply fuel to one or more engines 102 on an aircraft 180. In certain implementations, the aircraft 180 includes wings 184 extending outwardly from a fuselage 180. The source tank 104 may be disposed within the fuselage 182. One or more engines 102 may be mounted to the wings 184. In the example shown, a first engine 102*a* is mounted to a first wing 184*a* and a second engine 102*b* is mounted to a second wing 184*b*. In other example, multiple engines 102 can be mounted to each wing 184.

In certain implementations, the fuel delivery system 100 has two pumping tanks 118*a*, 188*b* and two transition tanks 110*a*, 110*b* as described above with reference to FIG. 2. In certain implementations, each of the pumping tanks 118*a*, 118*b* is connected to a respective one of the transition tanks 110*a*, 100*b*, the dump tank 136, the source tank 104, and a respective one of the engines 102. In the depicted example of FIG. 5, the engine 102*a* is connected to the first pumping tank 118*a* and the engine 102*b* is connected to the second pumping tank 118*b*. In certain implementations, the fuel delivery system 100 has two pumping tanks 118*a*, 188*b* and two transition tanks 110*a*, 110*b* for each engine 102. The fuel delivery system 100 may perform the intake stroke and the discharge stroke using both sets of pumping tanks 118*a*, 118*b* and combustion tanks 110*a*, 110*b* as described above. In certain examples, the engines 102 are turbine engines configured to propel the aircraft 180.

Referring to FIG. 7, a separate top-up chamber 192 can be disposed within the transition tank 110 or above the transition tank 110. For example, the top-up chamber 192 can be located within the gas holding region 116 of the transition tank 110. In certain examples, the top-up chamber 192 is smaller than the liquid receiving region 115 of the transition tank 110. In an example, the top-up tank 192 may hold about 1 liter of the cryogenic liquid. The top-up chamber 192 is designed to be independently fluidly connected (e.g., via valve arrangements 184, 198, 204) to the dump tank 136, the gas holding region 116 of the transition tank 110, and the liquid region 120 of the pumping tank 118, but with only one connection being open at any one time. The top-up chamber 192 is used as a way of passing a small quantity of liquid hydrogen from the pumping tank 118 to the transition tank 110.

To fill the top-up chamber 192 with cryogenic liquid, the connections to the transition tank 110 and the pumping tank 118 are closed and the connection to the dump tank 136 is opened. When the top-up chamber 192 has been depressurized via the dump tank 136, the connection to the dump tank 136 is closed. Then, the connection between the top-up chamber 192 and the pumping tank 118 is opened (e.g., during the discharge stroke). With the connection to the pumping tank 118 open, the top-up chamber 192 is filled with cryogenic liquid from the pumping tank 118 and then this connection is closed. Next, the top-up chamber 192 can be opened to the gas holding region 116 of the transition tank 110 to mitigate or equalize any pressure differential between them. Without a pressure differential, the cryogenic liquid will gravity pour (see 196) out of the top-up chamber 192 into the liquid receiving region 115 of the transition tank 110. In certain implementations, this connection between the top-up chamber 192 and the gas holding region 116 can be left open until the next top-up cycle is required, by which time the top-up chamber 192 will contain gaseous hydrogen (rather than liquid hydrogen). This process minimizes the "waste" hydrogen that will be discharged to the dump tank 136 on the next cycle. In certain implementations, a level sensor in the transition tank 110 can be used to control how frequently this top-up process is performed.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

Inventive aspects of the disclosure are further listed below.

Aspect 1. A liquid delivery system comprising: a source tank having a first internal pressure, the source tank being configured to hold a cryogenic liquid at the first internal pressure; a transition tank including a heat supply region, a liquid receiving region, and a gas holding region, the transition tank being configured to use the heat supply region to heat the cryogenic liquid disposed at the liquid receiving region to a gas, which collects in the gas holding region, thereby pressurizing the gas above the first internal pressure; a pumping tank including a liquid region and a gaseous region, the pumping tank having an outlet; a first low pressure line configured to selectively supply a first portion of the cryogenic liquid from the source tank to the liquid region of the pumping tank; a second low pressure line configured to selectively supply a second portion of the cryogenic liquid from the source tank to the liquid receiving region of the transition tank; and a high pressure line configured to selectively supply the pressurized gas collected within the gas holding region of the transition tank to the gaseous region of the pumping tank, whereby the pressurized gas expels the first portion of the cryogenic liquid out of the pumping tank through the outlet.

Aspect 2. The liquid delivery system of aspect 1, further comprising: a dump tank having a second internal pressure that is lower than the first internal pressure; a first dump line configured to supply gas from the gaseous region of the pumping tank to the dump tank; and a second dump line configured to supply gas from the gas holding region of the transition tank to the dump tank.

Aspect 3. The liquid delivery system of aspect 1 or aspect 2, wherein the transition tank is a first transition tank and the pumping tank is a first pumping tank; and wherein the liquid delivery system further comprises: a second transition tank including a heat supply region, a liquid receiving region, and a gas holding region, the second transition tank being configured to use the respective heat supply region to heat liquid disposed at the respective liquid receiving region to a gas, which collects in the respective gas holding region, thereby pressurizing the gas above the first internal pressure; a second pumping tank including a liquid region and a gaseous region, the second pumping tank having an outlet; a third low pressure line configured to selectively supply a third portion of the cryogenic liquid from the source tank to the liquid region of the second pumping tank; a fourth low pressure line configured to selectively supply a fourth portion of the cryogenic liquid from the source tank to the liquid receiving region of the second transition tank, the fourth portion being less than the third portion; and a second high pressure line configured to selectively supply the pressurized gas collected within the gas holding region of the second transition tank to the gaseous region of the second pumping tank, whereby the pressurized gas expels the third portion of the liquid out of the second pumping tank through the outlet of the second pumping tank.

Aspect 4. The liquid delivery system of aspect 3, wherein the outlets of the first and second pumping tanks output to a common output line.

Aspect 5. The liquid delivery system of any of aspects 1-4, further comprising a return line extending between the dump tank and the source tank, the return line extending through a heat exchanger configured to transition gas from the dump tank back into a cryogenic liquid to be returned to the source tank.

Aspect 6. The liquid delivery system of aspect 5, wherein an output from the pumping tank is routed past or through the heat exchanger to provide cooling to the gas.

Aspect 7. The liquid delivery system of any of aspects 1-4, further comprising a heat exchanger to replenish the pumping tank.

Aspect 8. The liquid delivery system of any of aspects 1-6, further comprising a fill line extending between the liquid region of the pumping tank and the liquid receiving region of the transition tank to enable at least some of the liquid from the pumping tank to be supplied to the transition tank.

Aspect 9. The liquid delivery system of aspect 8, wherein the fill line is separate from the outlet of the pumping tank.

Aspect 10. The liquid delivery system of any of aspects 1-9, wherein the heat supply region of the transition tank includes a heating element.

Aspect 11. The liquid delivery system of any of aspects 1-10, wherein the heat supply region of the transition tank includes a passage leading to atmosphere.

Aspect 12. The liquid delivery system of any of aspects 1-11, further comprising a supply line extending between the dump tank and the heat supply region of the transition tank.

Aspect 13. The liquid delivery system of any of aspects 1-12, wherein the dump tank is vented to atmosphere.

Aspect 14. The liquid delivery system of any of aspects 1-13, wherein cryogenic liquid is liquid hydrogen.

Aspect 15. The liquid delivery system of any of aspects 1-14, wherein the liquid delivery system is disposed onboard an aircraft to delivery fuel to one or more engines of the aircraft.

Aspect 16. The liquid delivery system of aspect 15, wherein each engine is connected to at least two pumping tanks.

Aspect 17. A method of delivering a fuel to an engine comprising: delivering a first portion of the fuel from a fuel tank to a pumping tank using a pressure differential between the fuel tank and the pumping tank; delivering a second portion of the fuel from the fuel tank to a transition tank using a pressure differential between the fuel tank and the transition tank; heating the second portion of the fuel within the transition tank to transition at least some of the second portion of the fuel into a gas and continuing to the heat the second portion of the fuel to pressurize the gas; and delivering the pressurized gas from the transition tank to the pumping tank so that the pressurized gas acts on the first portion of the fuel to expel the fuel from the pumping tank.

Aspect 18. The method of aspect 17, further comprising: depressurizing the pumping tank after the first portion of the fuel has been expelled from the pumping tank by opening a connection between the pumping tank and a dump tank.

Aspect 19. The method of aspect 17 or 18, further comprising: depressurizing the transition tank after the first portion of the fuel has been expelled from the pumping tank by opening a connection between the transition tank and the dump tank.

Aspect 20. The method of aspects 17-19, wherein the fuel includes a cryogenic liquid.

Aspect 21. The method of aspects 17-20, wherein the fuel includes liquid hydrogen.

Aspect 22. The method of aspects 17-21, wherein the first portion of the fuel from the fuel tank is delivered to the pumping tank by a first low pressure line.

Aspect 23. The method of aspects 17-22, wherein the second portion of the fuel from the fuel tank is delivered to the transition tank by a second low pressure line.

Aspect 24. The method of aspects 17-23, wherein the second portion of the fuel is heated within the transition tank by a heating element.

Aspect 25. The method of aspects 17-23, wherein the second portion of the fuel is heated within the transition tank by ambient air.

Aspect 26. A method of pumping a cryogenic liquid through a system including a source tank, a transition tank, a pumping tank, and a dump tank, the method comprising:

performing an intake stroke including: closing an outlet of the pumping tank; opening a first valve arrangement to connect the source tank to the pumping tank while the source tank has a higher internal pressure than the pumping tank; closing a second valve arrangement to disconnect the transition tank and the pumping tank; opening a third valve arrangement to connect the pumping tank and the dump tank, wherein the dump tank has a lower internal pressure than the pumping tank; and performing a discharge stroke after performing the intake stroke, the discharge stroke including: closing the first valve arrangement to disconnect the source tank and the pumping tank; opening the second valve arrangement to connect the transition tank and the pumping tank; and closing the third valve arrangement to disconnect the pumping tank and the dump tank.

Aspect 27. The method of aspect 26, further comprising heating a portion of the cryogenic liquid within the transition tank to transition the cryogenic liquid into a pressurized gas.

Aspect 28. The method of aspect 27, wherein heating the portion of the cryogenic liquid occurs through both the intake stroke and the discharge stroke.

Aspect 29. The method of aspect 26, wherein the intake stroke further comprises opening a fourth valve arrangement to connect the transition tank and the dump tank, wherein the dump tank has a lower internal pressure than the transition tank.

Aspect 30. The method of aspect 26, wherein the discharge stroke further comprising: opening a fifth valve arrangement to connect the source tank to the transition tank while the source tank has a higher internal pressure than the transition tank.

Aspect 31. The method of any of aspects 26-30, further comprising: repeating the intake stroke and the discharge stroke during a flight of an aircraft, wherein the cryogenic liquid is a fuel for an engine of the aircraft.

What is claimed is:

1. A liquid delivery system comprising:

a source tank having a first internal pressure, the source tank being configured to hold a cryogenic liquid at the first internal pressure;

a transition tank including a heat supply region, a liquid receiving region, and a gas holding region, the transition tank being configured to use the heat supply region to heat the cryogenic liquid disposed at the liquid receiving region to a gas, which collects in the gas holding region, thereby pressurizing the gas above the first internal pressure;

a pumping tank including a liquid region and a gaseous region, the pumping tank having an outlet;

a first low pressure line configured to selectively supply a first portion of the cryogenic liquid from the source tank to the liquid region of the pumping tank;

a second low pressure line configured to selectively supply a second portion of the cryogenic liquid from the source tank to the liquid receiving region of the transition tank; and a high pressure line configured to selectively supply the pressurized gas collected within the gas holding region of the transition tank to the gaseous region of the pumping tank, whereby the pressurized gas expels the first portion of the cryogenic liquid out of the pumping tank through the outlet.

2. The liquid delivery system of claim 1, further comprising:

a dump tank having a second internal pressure that is lower than the first internal pressure;

a first dump line configured to supply gas from the gaseous region of the pumping tank to the dump tank; and a second dump line configured to supply gas from the gas holding region of the transition tank to the dump tank.

3. The liquid delivery system of claim 1, wherein the transition tank is a first transition tank and the pumping tank is a first pumping tank; and wherein the liquid delivery system further comprises:

a second transition tank including a heat supply region, a liquid receiving region, and a gas holding region, the second transition tank being configured to use the respective heat supply region to heat liquid disposed at the respective liquid receiving region to a gas, which collects in the respective gas holding region, thereby pressurizing the gas above the first internal pressure;

a second pumping tank including a liquid region and a gaseous region, the second pumping tank having an outlet;

a third low pressure line configured to selectively supply a third portion of the cryogenic liquid from the source tank to the liquid region of the second pumping tank;

a fourth low pressure line configured to selectively supply a fourth portion of the cryogenic liquid from the source tank to the liquid receiving region of the second transition tank, the fourth portion being less than the third portion; and a second high pressure line configured to selectively supply the pressurized gas collected within the gas holding region of the second transition tank to the gaseous region of the second pumping tank, whereby the pressurized gas expels the third portion of the liquid out of the second pumping tank through the outlet of the second pumping tank.

4. The liquid delivery system of claim 3, wherein the outlets of the first and second pumping tanks output to a common output line.

5. The liquid delivery system of claim 2, further comprising a return line extending between the dump tank and the source tank, the return line extending through a heat exchanger configured to transition gas from the dump tank back into a cryogenic liquid to be returned to the source tank.

6. The liquid delivery system of claim 5, wherein an output from the pumping tank is routed past or through the heat exchanger to provide cooling to the gas.

7. The liquid delivery system of claim 1, further comprising a heat exchanger to replenish the transition tank.

8. The liquid delivery system of claim 1, further comprising a fill line extending between the liquid region of the pumping tank and the liquid receiving region of the transition tank to enable at least some of the liquid from the pumping tank to be supplied to the transition tank.

9. The liquid delivery system of claim 8, wherein the fill line is separate from the outlet of the pumping tank.

10. The liquid delivery system of claim 1, wherein the heat supply region of the transition tank includes a heating element.

11. The liquid delivery system of claim 1, wherein the heat supply region of the transition tank includes a passage leading to atmosphere.

12. The liquid delivery system of claim 1, further comprising a supply line extending between a dump tank and the heat supply region of the transition tank.

13. The liquid delivery system of claim 2, wherein the dump tank is vented to atmosphere.

14. The liquid delivery system of claim 1, wherein cryogenic liquid is liquid hydrogen.

15. The liquid delivery system of claim 1, wherein the liquid delivery system is disposed onboard an aircraft to delivery fuel to one or more engines of the aircraft.

* * * * *